United States Patent
Nilsson

(10) Patent No.: US 9,919,831 B2
(45) Date of Patent: Mar. 20, 2018

(54) PACKAGE CLOSURE AND A DEVICE AND A METHOD FOR PRODUCING A PACKAGE CLOSURE

(75) Inventor: Hugo Nilsson, Ljungby (SE)

(73) Assignee: Petro Pack AB, Ljungby (SE)

( * ) Notice: Subject to any disclaimer, the term of this patent is extended or adjusted under 35 U.S.C. 154(b) by 1067 days.

(21) Appl. No.: 13/818,717

(22) PCT Filed: Sep. 6, 2011

(86) PCT No.: PCT/SE2011/051073
§ 371 (c)(1),
(2), (4) Date: Feb. 25, 2013

(87) PCT Pub. No.: WO2012/033451
PCT Pub. Date: Mar. 15, 2012

(65) Prior Publication Data
US 2013/0146559 A1     Jun. 13, 2013

(30) Foreign Application Priority Data
Sep. 7, 2010   (SE) ...................................... 1050916

(51) Int. Cl.
*B65B 7/14*   (2006.01)
*B65D 8/00*   (2006.01)
(Continued)

(52) U.S. Cl.
CPC .......... *B65D 11/04* (2013.01); *B29C 45/0055* (2013.01); *B29C 45/0081* (2013.01);
(Continued)

(58) Field of Classification Search
CPC ..... B29C 45/44; B29C 45/04; B29C 42/0055; B29C 45/0081; B29C 45/40; B65D 11/04;
(Continued)

(56) References Cited

U.S. PATENT DOCUMENTS 3,283,047 A * 11/1966 Savary .................. B29C 49/482
264/318
3,957,944 A   5/1976 Guala
(Continued)

FOREIGN PATENT DOCUMENTS

| AU | 2009100256 | 6/2009 |
| WO | 94-14588 | 7/1994 |
| WO | 2009136836 | 11/2009 |

OTHER PUBLICATIONS

International Search Report from corresponding International Application No. PCT/SE2011/051073, dated Dec. 12, 2011.

*Primary Examiner* — J. Gregory Pickett
*Assistant Examiner* — Niki M Eloshway
(74) *Attorney, Agent, or Firm* — Renner, Otto, Boisselle & Sklar, LLP

(57) ABSTRACT

A package closure (10) comprising a neck (18) provided with an opening, and a cap (19) for closing the opening, wherein the neck (18) comprises a connecting portion (20) for connection to a package (32), and a sealing portion (21) projecting radially inwards from the connecting portion (20) to interact with the cap (19) to form a seal between them. Before opening thereof the cap (19) is connected to the sealing portion (21) through a notch (23), wherein the cap (19) is removable from at least a part of the sealing portion (21) by tearing along the notch (23). The cap (19) is provided with a sealing part (24) projecting from an interior side of the cap (19) to interact with the sealing portion (21) of the neck (18), so that the package closure (10) is resealable. The invention also relates to a device and a method for producing a package closure.

16 Claims, 16 Drawing Sheets

Figure 1:
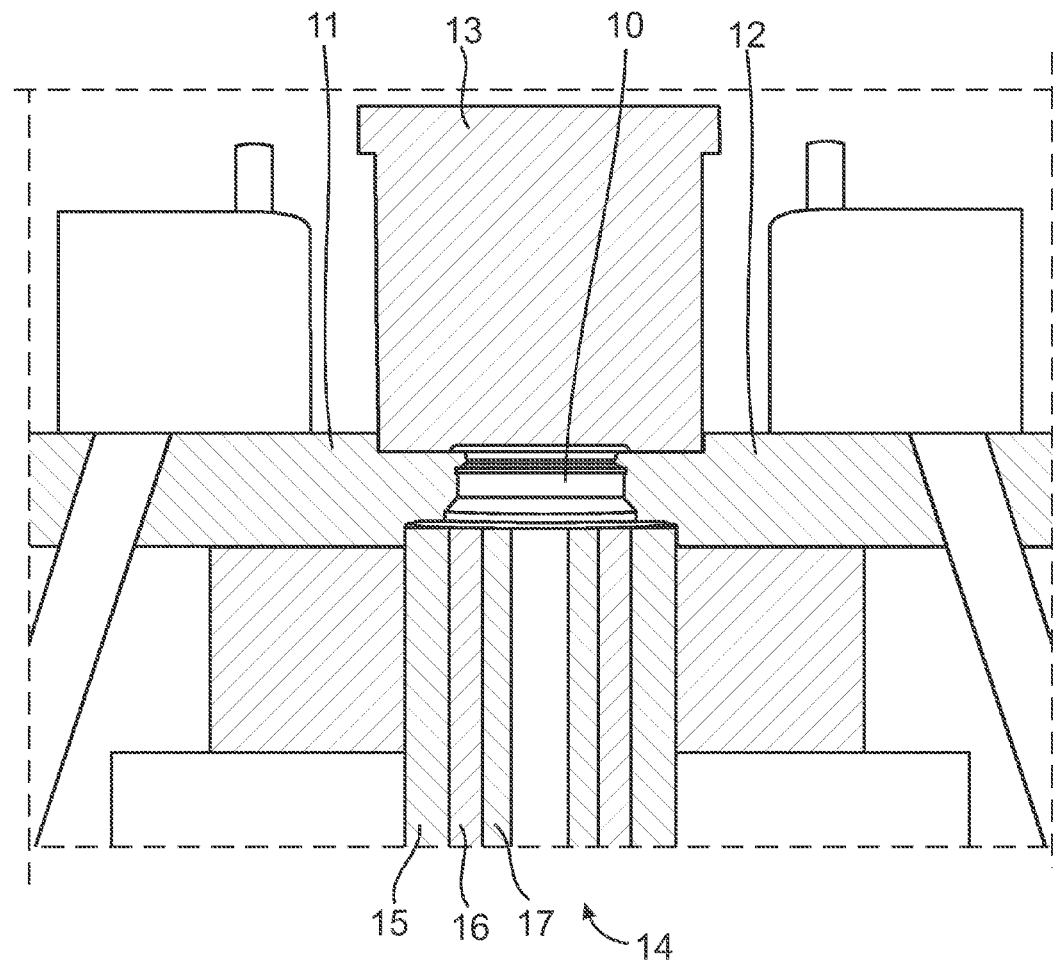

(51) Int. Cl.
*B29C 45/00* (2006.01)
*B29C 45/40* (2006.01)
*B65D 5/74* (2006.01)
*B65D 47/08* (2006.01)
*B65D 47/10* (2006.01)
*B29C 45/04* (2006.01)
*B29C 45/44* (2006.01)
*B65D 41/48* (2006.01)
*B65D 47/36* (2006.01)
*B65D 39/00* (2006.01)
*B29L 31/56* (2006.01)

(52) U.S. Cl.
CPC ............. *B29C 45/04* (2013.01); *B29C 45/40* (2013.01); *B29C 45/44* (2013.01); *B65D 5/746* (2013.01); *B65D 41/48* (2013.01); *B65D 47/0804* (2013.01); *B65D 47/10* (2013.01); *B65D 47/36* (2013.01); *B29L 2031/565* (2013.01); *B65D 2101/0092* (2013.01)

(58) Field of Classification Search
CPC ........ B65D 41/48; B65D 47/06; B65D 47/10; B65D 5/746; B65D 41/18; B65D 47/0804; B65D 47/36; B65D 2101/0092; B29L 2031/565
USPC ........... 215/43, 48, 256; 425/556; 264/328.1
See application file for complete search history.

(56) References Cited

U.S. PATENT DOCUMENTS

| | | | |
|---|---|---|---|
| 3,966,080 A * | 6/1976 | Bittel | B65D 47/10 220/269 |
| 4,019,663 A * | 4/1977 | Krautkramer | B65D 47/10 215/46 |
| 4,155,698 A | 5/1979 | Aichinger | |
| 4,552,328 A | 11/1985 | Dutt et al. | |
| 4,806,301 A | 2/1989 | Conti | |
| 4,909,404 A | 3/1990 | Rozenberg | |
| 5,512,228 A * | 4/1996 | Adams | B29C 45/006 264/152 |
| 5,678,719 A | 10/1997 | Adams et al. | |
| 6,158,622 A * | 12/2000 | Igarashi | B65D 47/10 222/107 |
| 7,105,119 B2 * | 9/2006 | Kanie | F16B 19/1081 264/238 |
| 2002/0027121 A1 | 3/2002 | Mcnary et al. | |
| 2002/0104843 A1 | 8/2002 | Smith et al. | |
| 2007/0039915 A1 | 2/2007 | Jackel | |
| 2010/0016824 A1* | 1/2010 | Palusci | B65D 47/02 604/403 |
| 2013/0221038 A1* | 8/2013 | Son | B65D 47/10 222/541.5 |

* cited by examiner

PACKAGE CLOSURE AND A DEVICE AND A METHOD FOR PRODUCING A PACKAGE CLOSURE

FIELD OF THE INVENTION

The invention relates to a package closure and a device and a method for producing a package closure. This type of package closures comprise a neck having an opening and a cap extending across the opening for closing thereof. Package closures of this type are arranged in plastic materials and have an inherent flexibility, such as thermoplastic materials or other plastic materials having similar properties. Package closures of this type are generally used for packages for liquid foodstuff, such as milk, juice, water, yoghurt and similar but can be used for any type of package.

PRIOR ART

There are a plurality of different types of package closures in the prior art. One such type of device is for example disclosed in WO2009136836. The package closure disclosed in WO2009136836 comprises a neck provided with an external thread, and a screw cap being connectable with the neck through the thread of the neck. The neck is arranged with a connecting portion for connection to a package, and a sealing lip projecting from the connecting portion in an angle to interact with the cap to form a seal between them. The cap is provided with a sealing part projecting from an interior side of the cap for interaction with the sealing lip of the neck, so that the package closure can be resealed.

One problem with such package closures of prior art is that they are complex and expensive to produce and consequently require expensive and advanced equipment for production thereof. The production requires at least two moulding tools, i.e. one for the cap and one for the neck, wherein the cap, in addition, must be mounted on the neck. Hence, a plurality of production steps is required to produce such prior art package closures.

One drawback of such prior art package closures is that they require a considerable amount of material. A screw cap requires a considerable rigidity of both cap and neck, which results in extensive material consumption.

SUMMARY OF THE INVENTION

An object of the present invention is to avoid the drawbacks and problems of the prior art. The package closure according to the invention results in considerable material savings and a simplified production process in which the entire package closure can be produced in a single step in a single tool without subsequent mounting of different parts of the package closure, while the package closure according to the invention results in a tight, tamper proof and resealable package closure.

The present invention relates to a package closure comprising a neck provided with an opening, and a cap for closing the opening, wherein the neck comprises a connecting portion for connection to a package, and a sealing portion projecting radially inwards from the connecting portion to interact with the cap to form a seal between them, characterised in that the cap, before opening thereof, is connected to the sealing portion through a notch, wherein the cap is removable from at least a part of the sealing portion by tearing along the notch, that the cap is provided with a sealing part projecting from an interior side of the cap to interact with the sealing portion of the neck, so that the package closure is resealable. The notch arranged between the cap and the sealing portion combined with the sealing part of the cap interacting with the sealing portion result in considerable material savings as the package closure can be obtained without screw cap or similar. Further, the package closure can be produced in a single tool in a single production step, which results in an energy-saving, environmentally friendly, simple and cost efficient production. The notch results in a tamper proof package closure and the sealing portion in combination with the sealing part of the cap provide a tight and resealable package closure.

The package closure can be arranged in a flexible and resilient plastic material, wherein the flexibility can be adjusted, for example, by means of determining the material thickness.

An interior side of the cap can be provided with a flange for interaction with a tool core in a device for producing the package closure, so that the cap is connected to the tool core during the production thereof. By the flange the cap can be connected to and retained at the tool core temporarily. At the same time the sealing portion can be arranged flexible and bendable in relation to the connecting portion, so that the connecting portion is displaceable in relation to the cap during bending of the sealing portion and folding along the notch when the cap is connected to the tool core through the flange. The flange can be arranged on the sealing part. Alternatively, the flange can be arranged on a projection connected to the cap, which then can be more rigid than the sealing portion. Hence, production of the cap and the neck in one piece, i.e. as one integrated unit, is facilitated to provide a resealable package closure having a tear notch. The sealing portion and the sealing part can interact through a snap-lock function to facilitate resealing of the cap.

The cap can be connected to the neck through a hinge portion, so that the cap can be pivoted around the hinge portion, and wherein a portion of the cap and the neck interact through a snap-lock function, so that the cap can be fastened to the neck in its open position. Hence, a hinged cap can be maintained in its open position during emptying of the package, so that the cap not unintentionally obstruct or interfere with the emptying.

The invention also relates to a device for producing a package closure having a neck and a cap, comprising a movable first jaw, a movable second jaw and a tool core for interaction with the jaws to form a mould for the package closure, and an ejector for ejecting the produced package closure, characterised in that the tool core and the jaws are arranged to form a connecting portion and a sealing portion of the neck and a notch between the neck and the cap, and that the tool core comprises a radially extending recess for forming and interaction with a flange on the interior side of the cap, so that the neck is displaceable in relation to the cap by means of the ejector during bending of the sealing portion and folding along the notch when the cap is connected to the tool core through the flange.

The invention also relates to a method for producing a package closure having a neck and a cap, characterised by the steps of by means of movable jaws and a tool core forming a connecting portion and a sealing portion of the neck and a notch between the sealing portion and the cap, by means of a radially extending recess of the tool core forming a flange on the interior side of the cap, the flange being for interaction with the tool core, removing the jaws from the moulded package closure, by means of the tool core holding back the cap by the flange arranged on the interior side of the cap and simultaneously, by means of an ejector, displacing the connecting portion of the neck in relation to the cap during bending of the sealing portion and folding along the notch, and by means of the ejector displacing the package closure in relation to the tool core, so that the flange is disengaged from the tool core.

Further characteristics and advantages of the present invention will become apparent from the description of the embodiments below, the appended drawings and the dependent claims.

SHORT DESCRIPTION OF THE DRAWINGS

Figure 2:
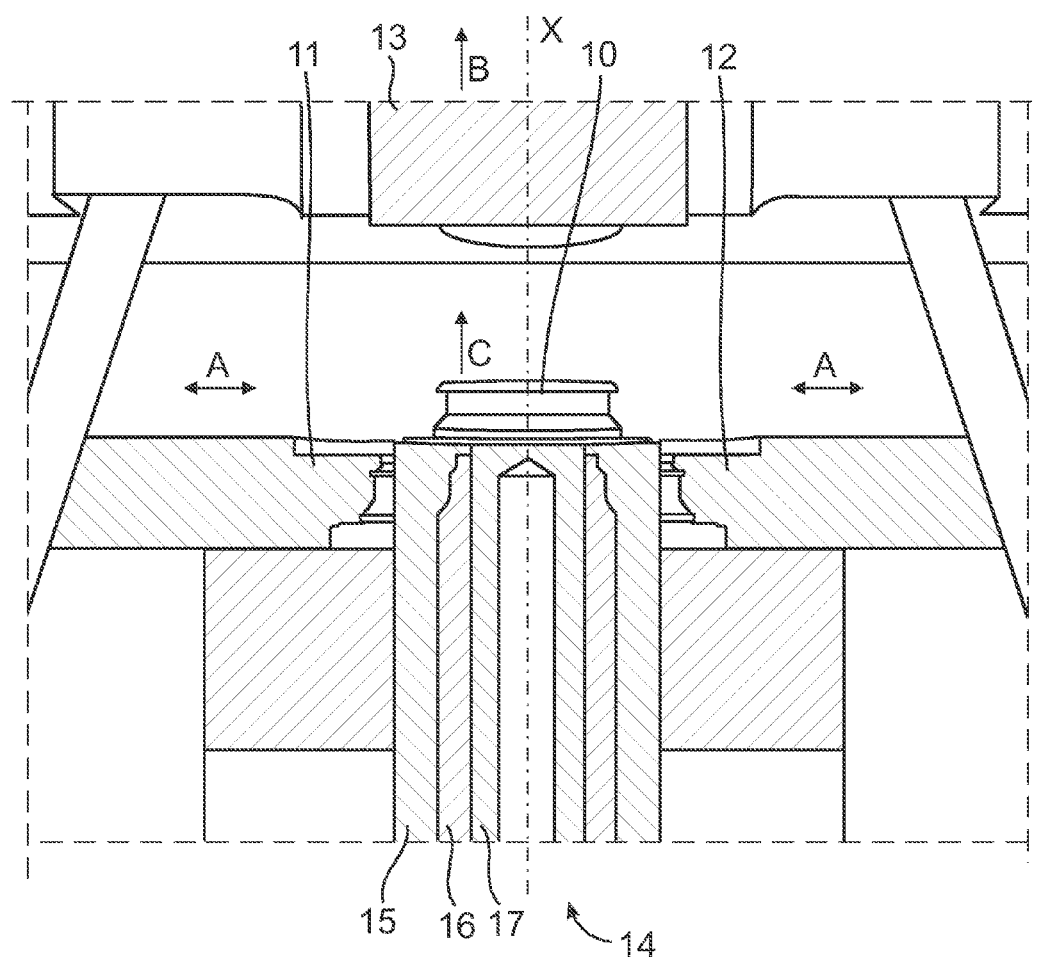
Figure 3:
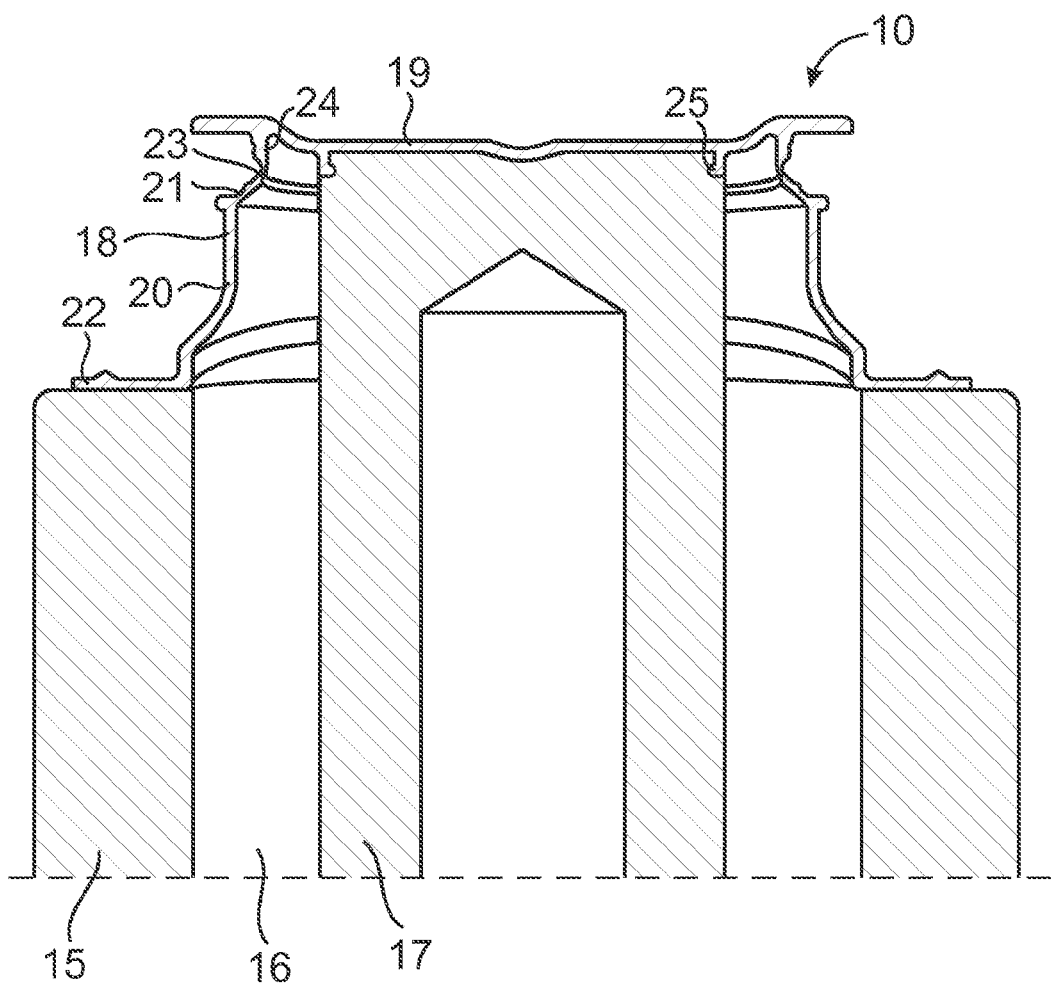
Figure 12:
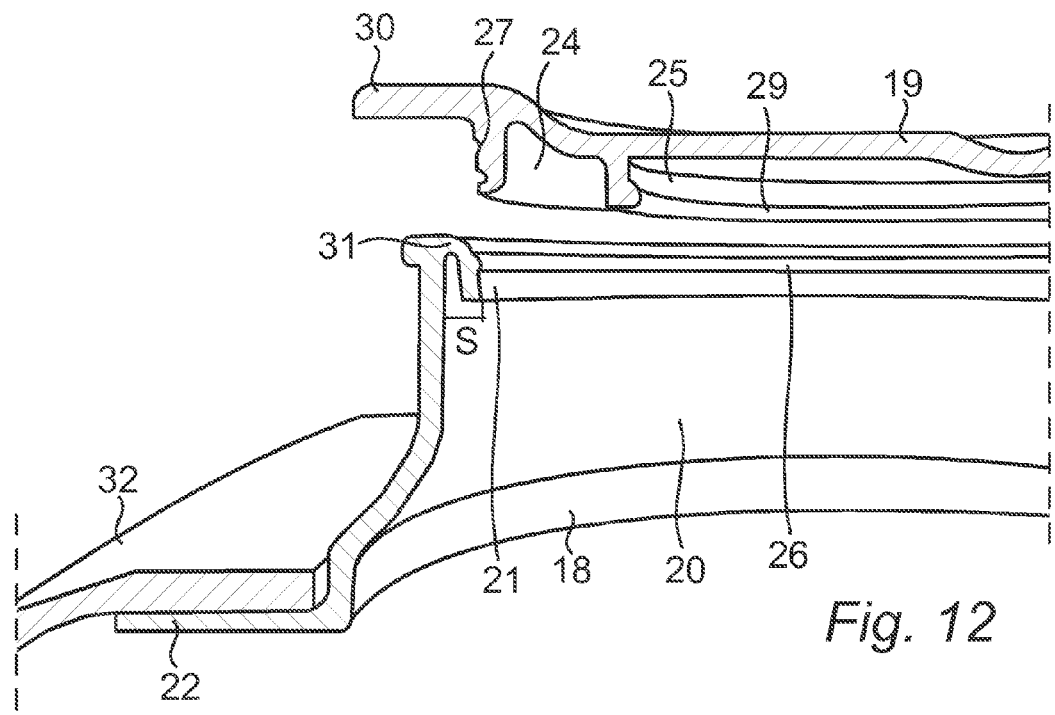
Figure 13:
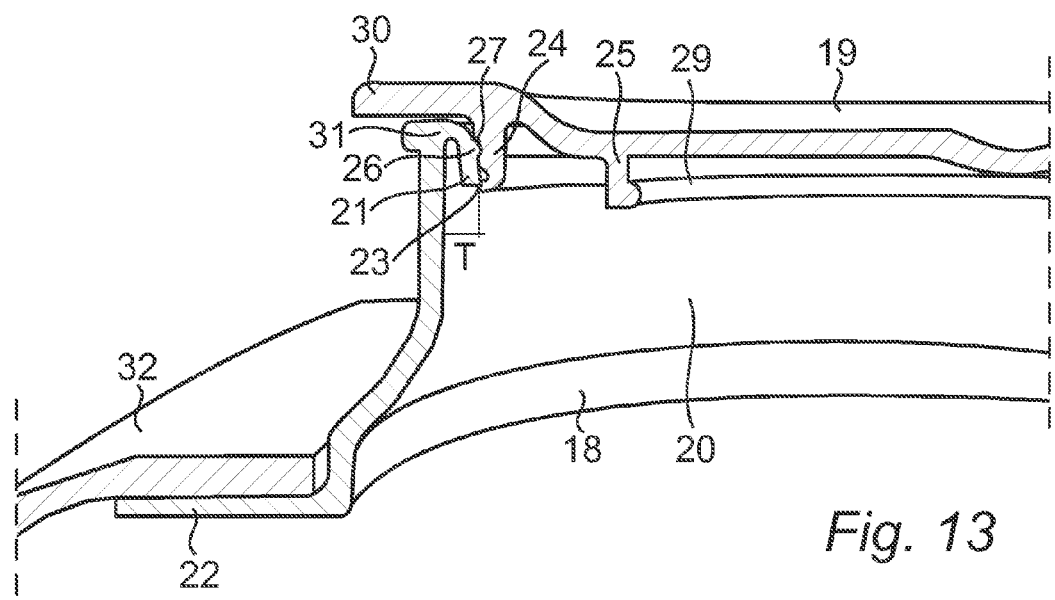
Figure 14:
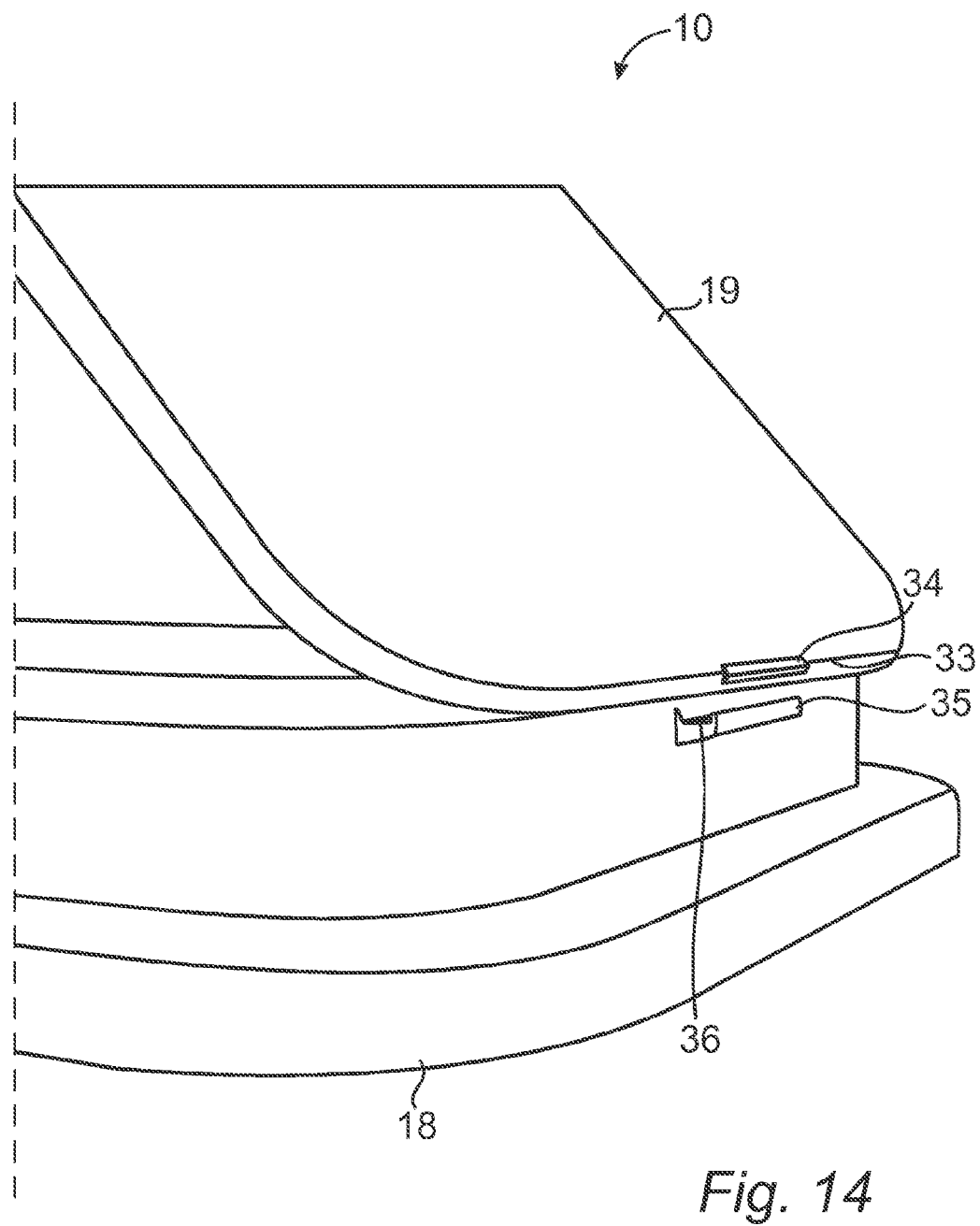
Figure 15:
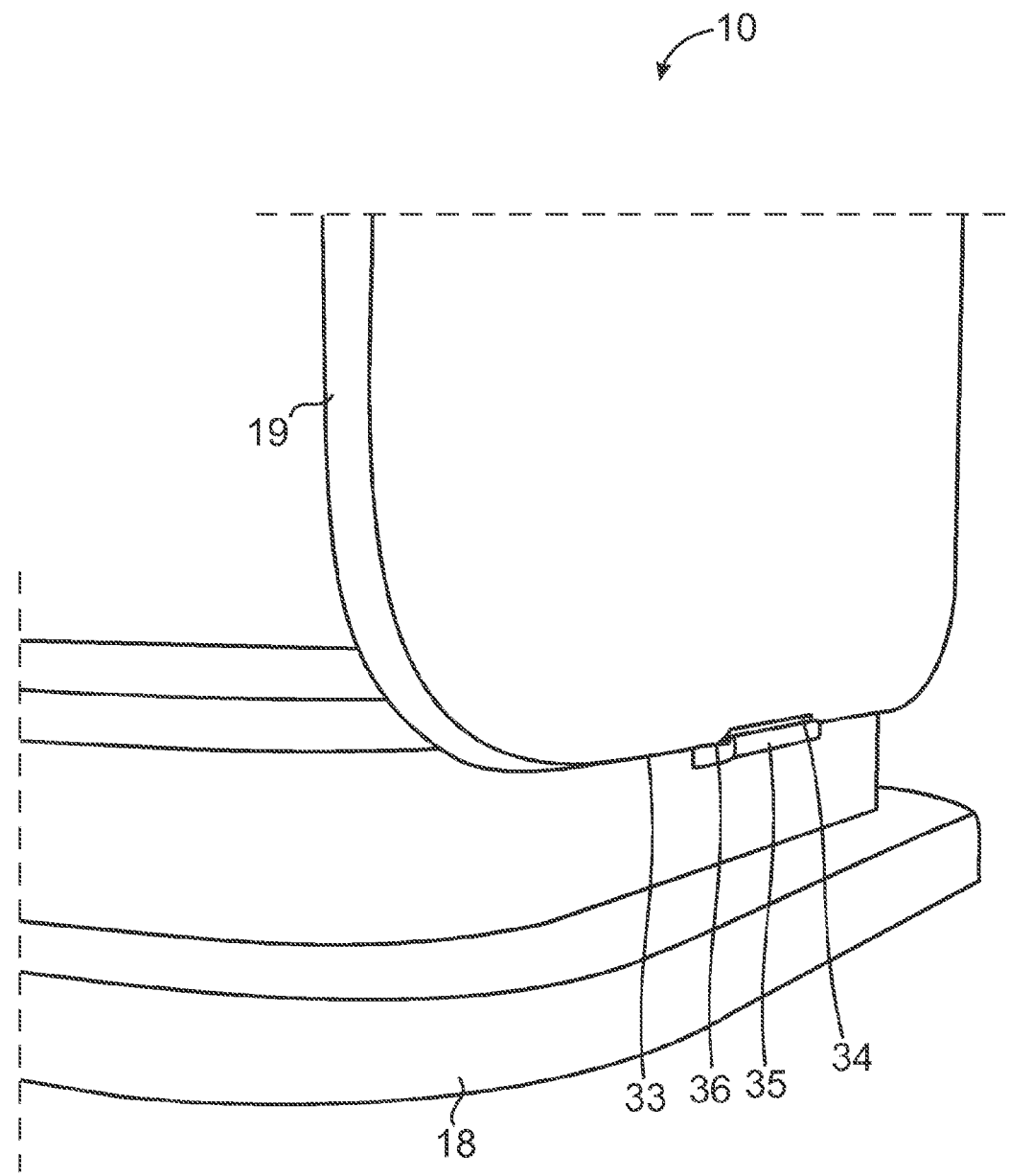
Figure 16:
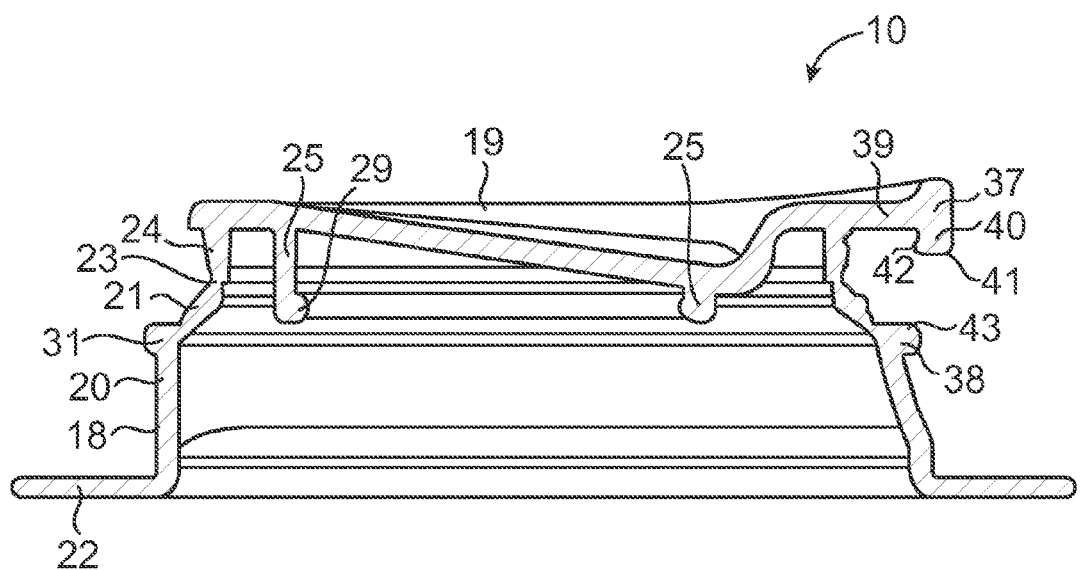
Figure 17:
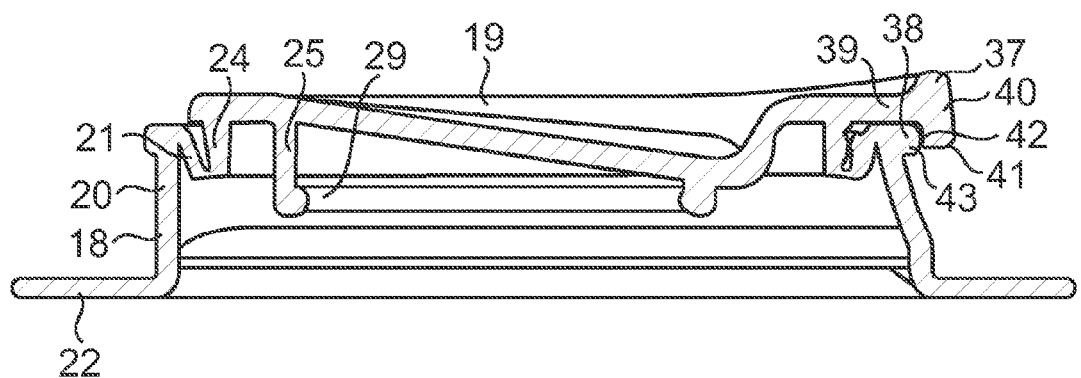
Figure 18:
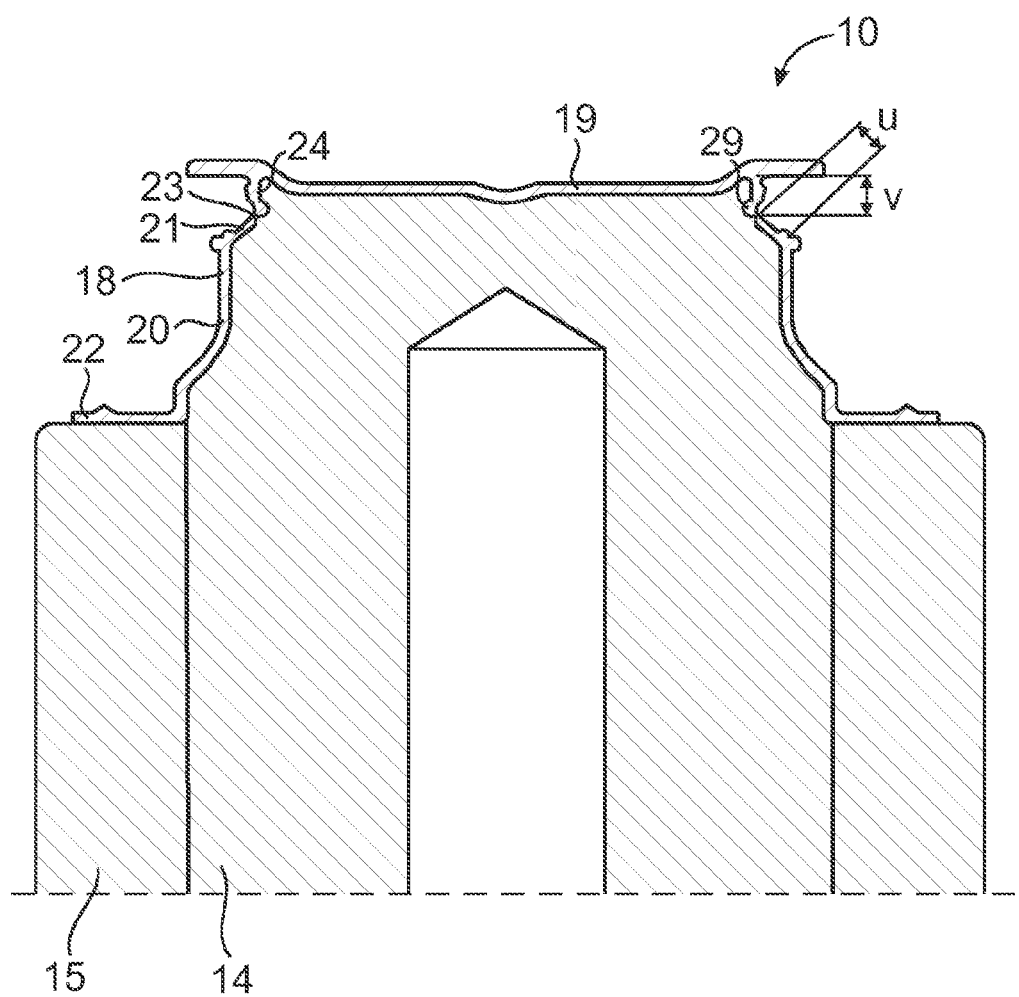
Figure 23:
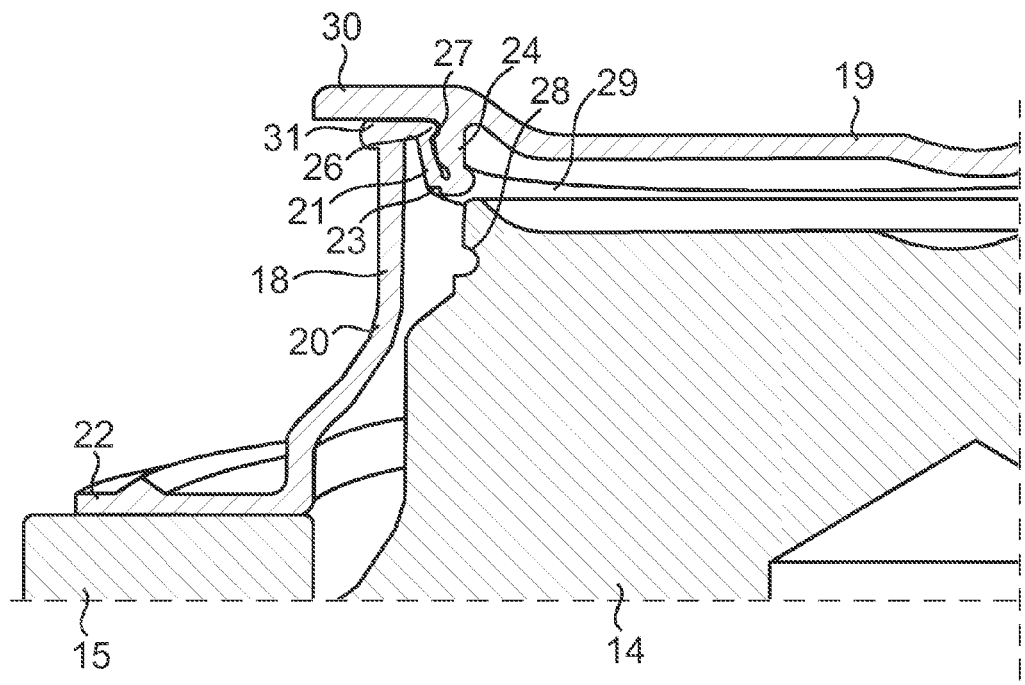
Figure 24:
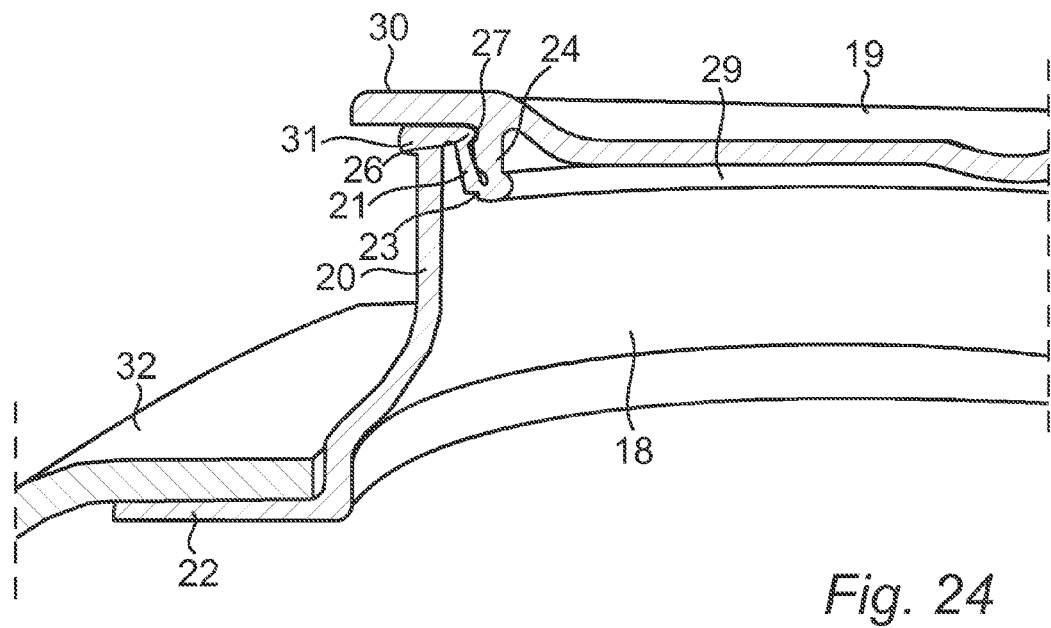
Figure 25:
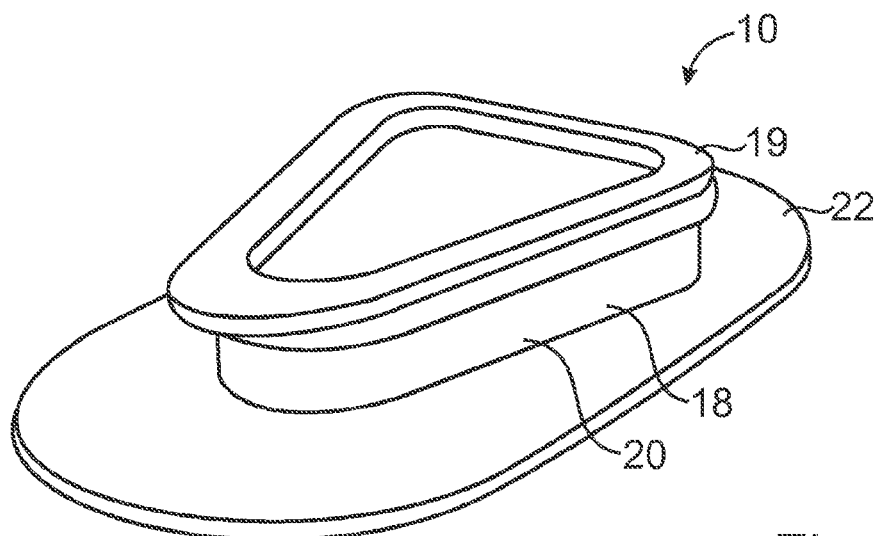
Figure 26:
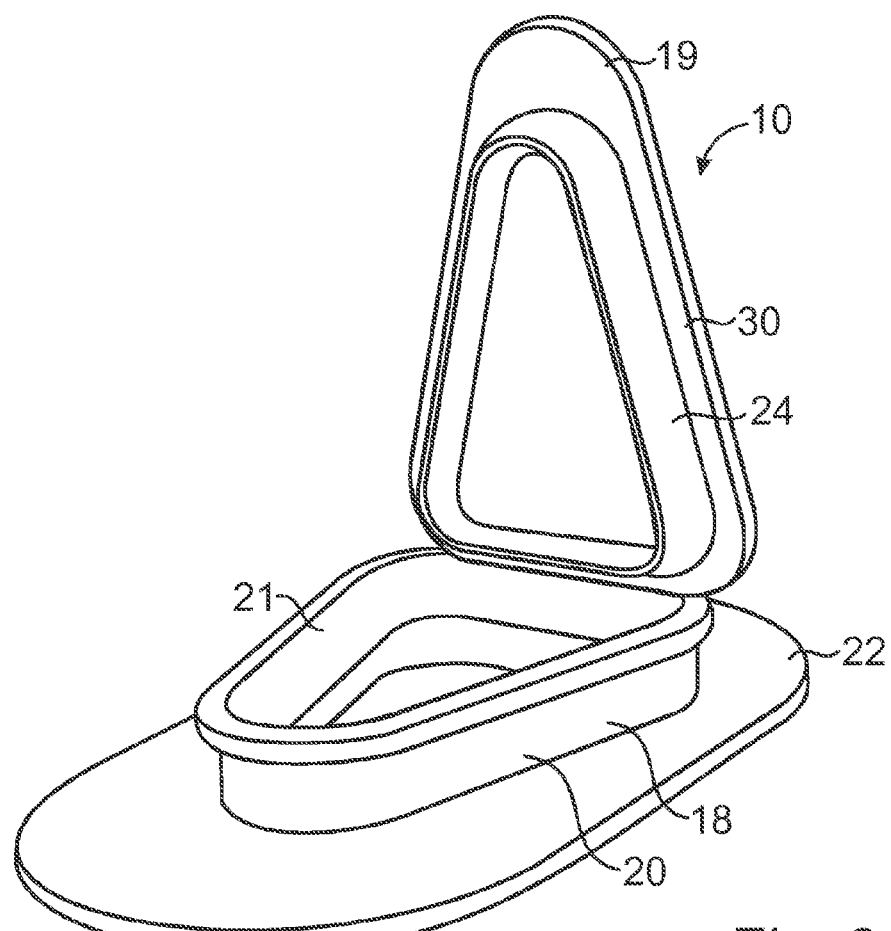

The invention will now be described more in detail with the aid of embodiments and with reference to the appended drawings, in which FIG. 1 is a schematic view, partly in section, of a package closure and a part of a device for producing the package closure according to one embodiment of the present invention, in which the device is in a position for moulding the package closure, FIG. 2 is a schematic view according to FIG. 1, in which the device is in a position for ejecting a produced package closure, FIG. 3 is a schematic cross section view of the package closure and a part of the device according to FIG. 1, FIGS. 4-8 is a series of schematic cross section views of a part of the device and the package closure according to one embodiment of the invention, illustrating a part of the method for producing the package closure, FIGS. 9-13 is a series of schematic cross section views of a part of the package closure according to one embodiment of the invention, illustrating opening and resealing of a cap of the package closure, FIG. 14 is a schematic perspective view of a part of the package closure according to one embodiment of the invention, in which a cap of the package closure is illustrated in a half open position, FIG. 15 is a schematic perspective view according to FIG. 14, wherein the cap is illustrated in a fully open position in which the cap interacts with a neck of the package closure by a snap-lock function for holding the cap in the open position, FIG. 16 is a schematic section view of a package closure according to one embodiment of the invention, in which the package closure is provided with an exterior fastening device illustrated in its unlocked position before finishing the package closure, FIG. 17 is a schematic section view according to FIG. 16, in which the package closure is finished and the fastening device is in a locked position, FIG. 18 is a schematic section view of the package closure and a part of the device for producing it according to one embodiment, FIGS. 19-23 is a series of schematic section views of a part of the device and the package closure according to one embodiment of the invention, illustrating a part of the method for producing the package closure, FIG. 24 is a schematic section view of the package closure according to one embodiment of the invention connected to a package, FIG. 25 is a schematic perspective view seen obliquely from above of a package closure in a closed position according to one embodiment of the invention, and FIG. 26 is a schematic view seen obliquely from above of the package closure in FIG. 25 in its open position.

THE INVENTION

Referring to FIG. 1 a package closure 10 and a part of a device for producing said package closure 10 is illustrated schematically. The package closure 10 is arranged in a flexible material, such as a suitable plastic material. For example, the package closure 10 is formed in a suitable thermoplastic, such as polyethylene. The device comprises a movable first jaw 11, a movable second jaw 12, a counterpart 13 and a tool core 14 interacting with the jaws 11, 12 and the counterpart 13 to form a mould for receiving an amount of plastic material for producing the package closure 10. The device further comprises a movable ejector 15 for ejecting the produced package closure 10, which is described in more detail below. The device is arranged as a moulding tool for moulding plastic materials. For example, the device is arranged for moulding plastic materials, wherein the jaws 11, 12 and/or the tool core 14 can be heated and/or cooled in a conventional manner. The jaws 11, 12 and the tool core 14 is arranged with a particular form for providing the mould for producing the package closure 10 according to the invention, which form is evident by the description of the features of the package closure 10 below.

In the embodiment of FIG. 1 the tool core 14 comprises an outer tool core 16 and an inner tool core 17 being movable in relation to the outer tool core 16. Hence, the inner tool core 17 is displaceable in the axial direction in relation to the inner tool core 16. For example, the outer tool core 17 is fixed.

In FIG. 1 the device is illustrated in a position in which the jaws 11, 12 interact with the counterpart 13 and the tool core 14 to form the mould for moulding the package closure 10 and in which a package closure 10 is in the mould, i.e. in contact with the jaws 11, 12, the counterpart 13 and the tool core 14.

With reference to FIG. 2 the device is illustrated in a position for ejecting a produced package closure 10. In the position of FIG. 2 the jaws 11, 12 and the counterpart 13 are disengaged from the package closure 10. Hence, the jaws 11, 12 are movable in a direction substantially perpendicular to a centre axis X of the package closure 10, which direction is illustrated by means of the arrow A in FIG. 2, between the position illustrated in FIG. 1 and the position illustrated in FIG. 2. The counterpart 13 is further movable in a direction along the centre axis X of the package closure 10, as illustrated by means of the arrow B in FIG. 2, between the position illustrated in FIG. 1 and the position illustrated in FIG. 2. When the jaws 11, 12 and the counterpart 13 are disengaged from the package closure 10 the package closure 10 can, by means of the ejector 15, be ejected forward axially in a direction along the centre axis X of the package closure 10, as illustrated by means of the arrow C in FIG. 2.

With reference to FIG. 3 the package closure and a part of the device are illustrated more in detail. In FIG. 3 an upper portion of the outer tool core 16 has been removed to show the arrangement of the package closure more clearly.

In the illustrated embodiment the package closure 10 is substantially cylindrical having a circular cross section. Alternatively, the cross section of the package closure 10 is elliptic, triangular, rectangular or arranged with any other shape, with or without rounded corners. The package closure 10 comprises a neck 18 with an opening, and a cap 19 extending perpendicular to the opening for closing thereof. For example, the cap 19 extends substantially radially. The neck 18 comprises a connecting portion 20 for connection with a package, and a sealing portion 21 projecting in an angle from the connecting portion 20. For example, the connecting portion 20 extends substantially axially. In the illustrated embodiment the connecting portion 20 is arranged with an angled portion 22 arranged in an angle to the connecting portion 20 to facilitate connection to a package. For example, the angular portion 22 projects substantially radially in relation to the connecting portion 20.

The sealing portion 21 is arranged thinner than the connecting portion 20 and projects inwards in relation to the connecting portion 20. The sealing portion 21 is terminated with a tapered portion forming a notch 23 connecting to the cap 19. Hence, the sealing portion 21 is connected to the cap 19 in one end when the cap 19 not has been opened and the notch 23 is intact. Hence, the outer tool core 16 is arranged to interact with the jaws 11, 12 to form the connecting portion 20 and the sealing portion 21 of the neck 18, and the notch 23 between the neck 18 and the cap 19.

The cap 19 is provided with a sealing part 24 projecting from an interior side of the cap 19, and a projection 25 projecting from the interior side of the cap 19. For example, the sealing part 24 and the projection 25 extend substantially axially and in parallel to each other. The sealing part 24 is arranged between a peripheral edge of the cap 19 and the projection 25, wherein the projection 25 is arranged between the centre axis X and the sealing part 24 and thus more centrally than the sealing part 24. The sealing part 24 is further connected to the sealing portion 21 of the neck 18 through the notch 23 when the notch 23 not has been broken. The projection 25 is flexible and arranged for interaction with the inner tool core 17, so that the cap 19 is connected to the inner tool core 17 through the projection 25 during the production of the package closure 10.

Figure 4:
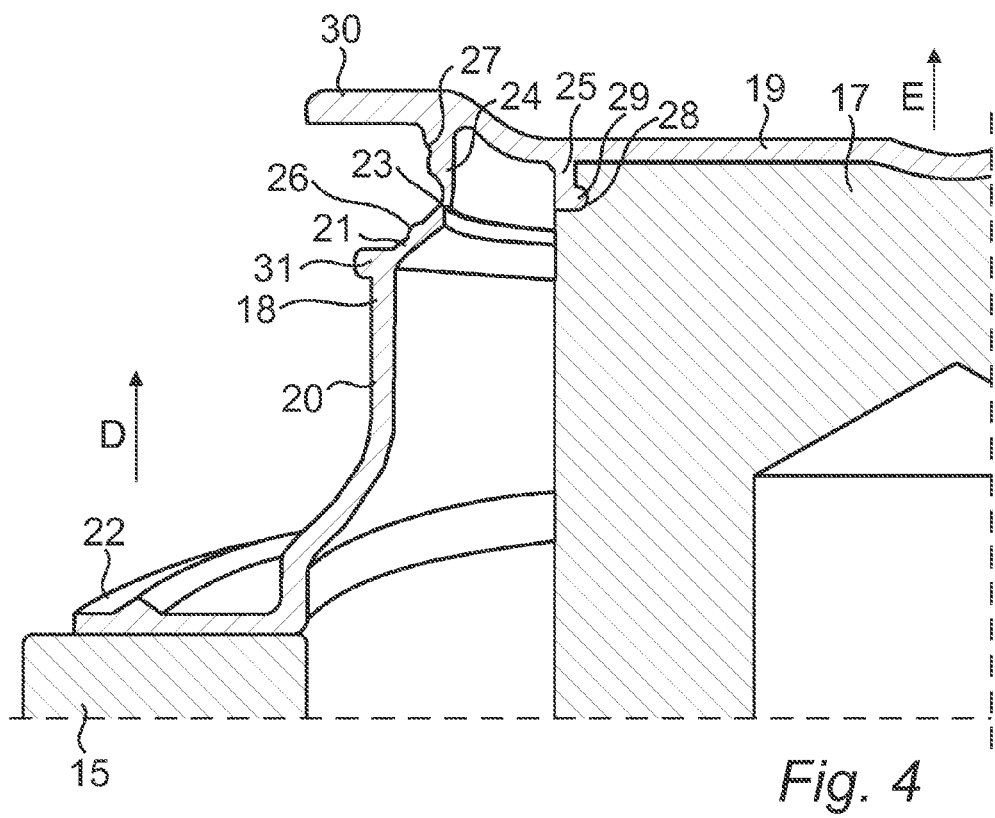
Figure 5:
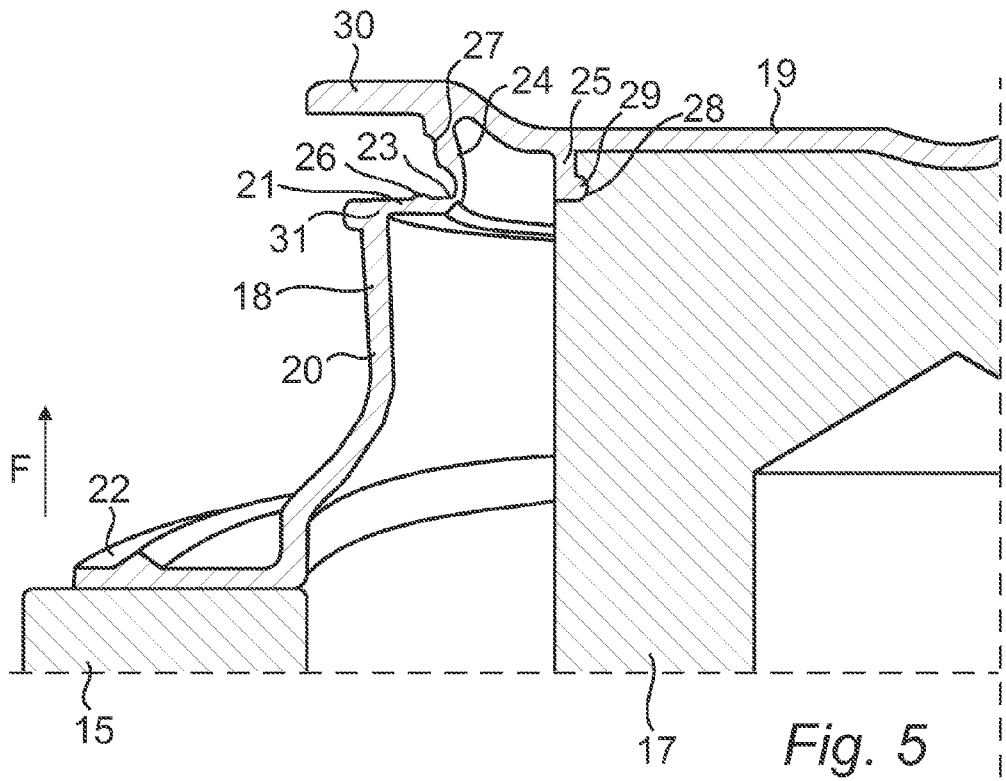

With reference to FIGS. 4-8 a part of the production of the package closure 10 is illustrated according to one embodiment of the invention. The outer tool core 16 has been removed from FIGS. 4-8. In FIGS. 4-8 an ejection process is illustrated schematically in which a moulded package closure 10 is ejected from the device during finishing thereof. In FIG. 4 the ejector 15 and the inner tool core 17 are illustrated in a position for moulding the package closure 10.

As evident from FIG. 4 the sealing portion 21 of the neck 18 is provided with a locking means 26 for interaction with a locking element 27 of the sealing part 24 of the cap 19 to form a snap-lock function, which is described more in detail below. In the illustrated embodiment the locking means 26 is arranged as a bulge, wherein the locking element 27 is arranged as a recess. For example, the recess is arranged substantially radially inwards towards the projection 25 and the centre axis X. Alternatively, the locking means 26 is arranged as a recess, wherein the locking element 27 is arranged as a bulge. The snap-lock function is provided by the inherent flexibility of the package closure 10 and, for example, the flexibility of the sealing portion 21. For example, the sealing portion 21 is inclined inwards in relation to the connecting portion 20.

The package closure 10 according to the invention is, for example, moulded in one piece, wherein the cap 19 and the neck 18 is a single integrated unit. The jaws 11, 12 and the tool core 14 form a continuous mould for moulding the neck 18 and the cap 19 in one continuous piece.

Figure 6:
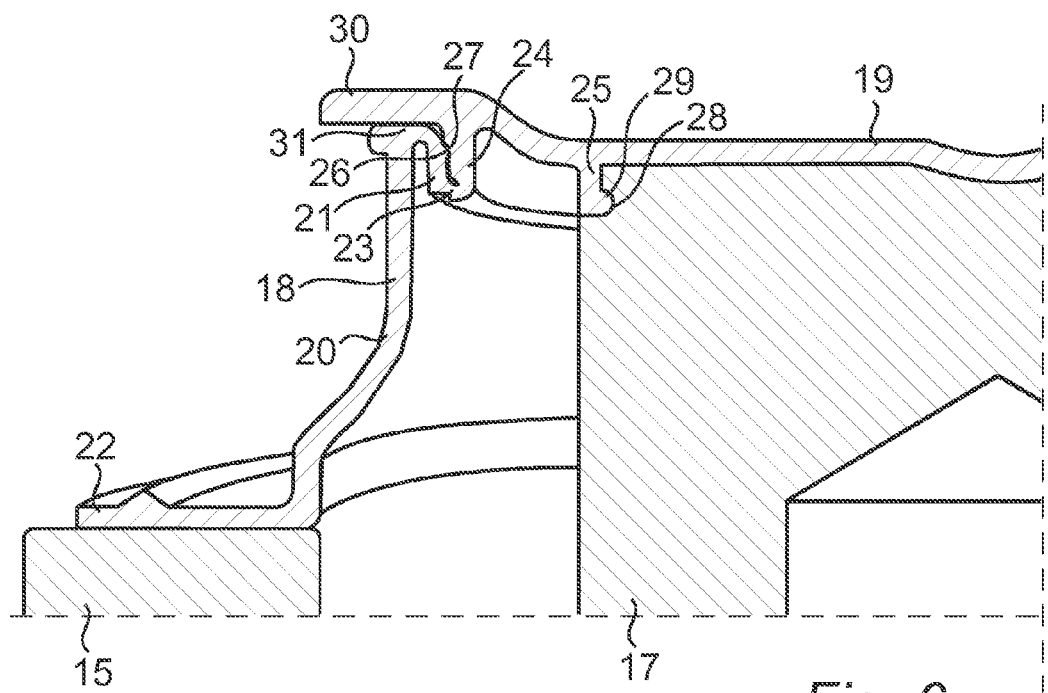
Figure 7:
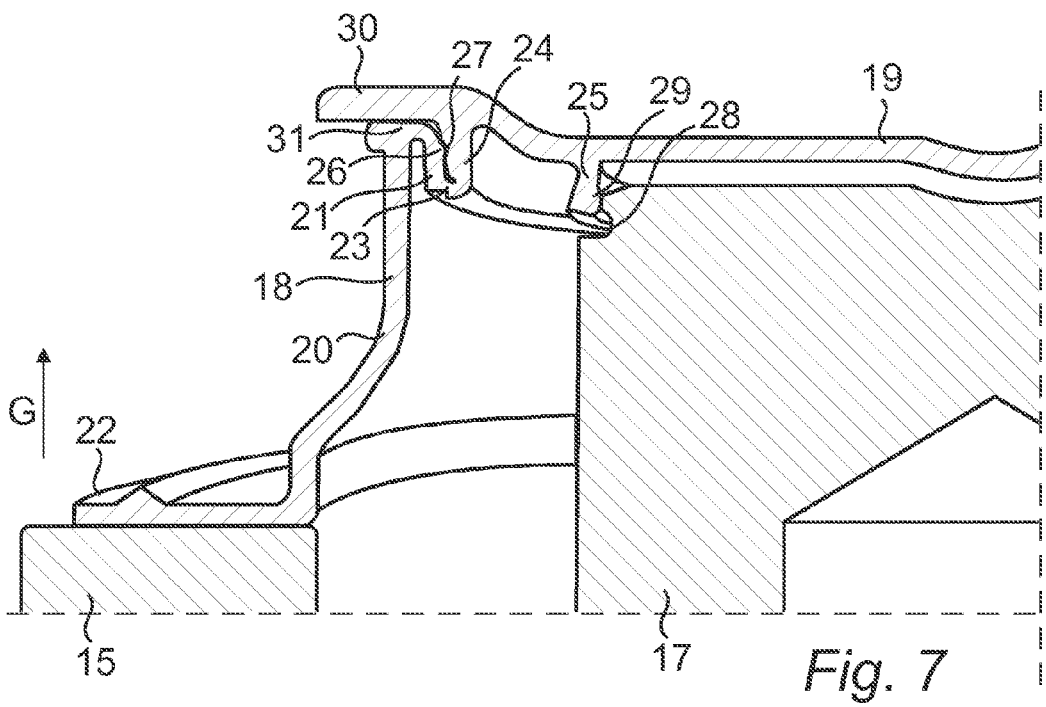
Figure 8:
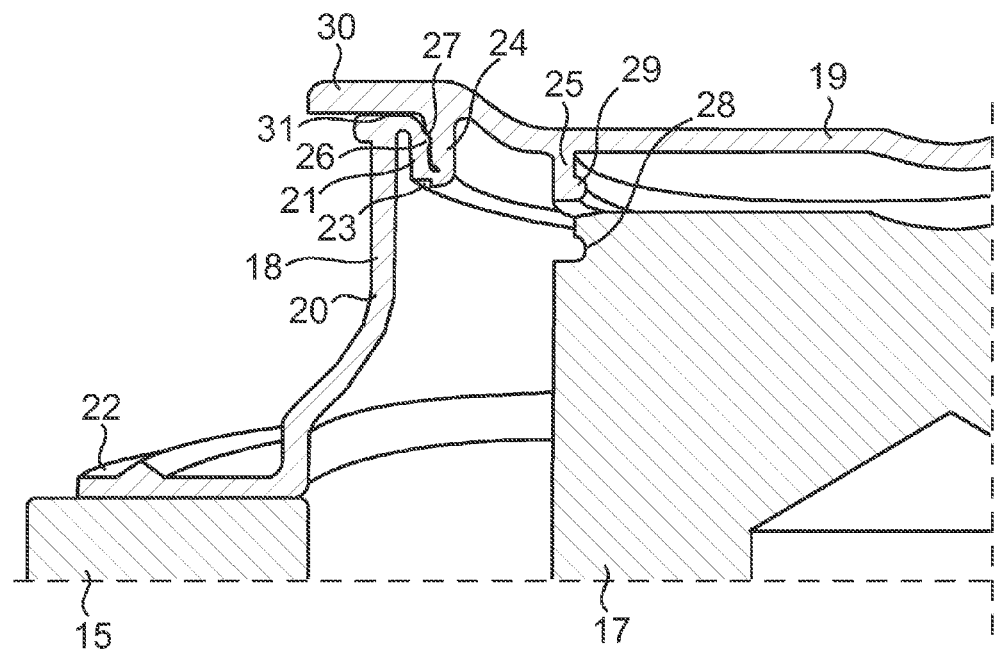

After moulding the package closure 10, when the material in the package closure 10 still is soft and not yet entirely has solidified or crystallized, both the ejector 15 and the inner tool core 17 is brought axially forward, as illustrated by means of the arrows D and E in FIG. 4, while bringing along the package closure 10 in the same direction, so that the cap 19, the sealing portion 21 and at least a part of the connecting portion 20 is disengaged from the outer tool core 16. Hence, the inner tool core 17 and the ejector 15 are displaceable in the axial direction in relation to the outer tool core 16. Alternatively, the outer tool core 16 is pulled backwards in relation to the ejector 15, the inner tool core 17 and the package closure 10. Then, the ejector 15 is displaced axially forward, as illustrated by means of the arrow F in FIG. 5, in relation to the inner tool core 17 while the inner tool core 17 interacts with the projection 25 to hold back the cap 19, so that the neck 18, by means of the ejector 15, is displaced in relation to the cap 19 for bending the sealing portion 21 and folding along the notch 23. Hence, the ejector 15 is displaceable in the axial direction in relation also to the inner tool core 17. The ejector 15 is displaced in relation to the cap 19 for folding the sealing portion 21 inwards, so called negative folding of the sealing portion 21, so that the sealing portion 21 is folded inwards and downwards towards the connecting portion 20. Hence, the sealing portion 21 is bent in relation to the connecting portion 20 of the neck 18 while the sealing portion 21 is folded in relation to the sealing part 24 of the cap 19 along the notch 23, so that the sealing portion 21 and the sealing part 24 are folded within the neck 18 or the connecting portion 20. To hold back the cap 19 temporarily the inner tool core 17 is, according to the illustrated embodiment, provided with a recess 28 for receiving the projection 25 or a flange 29 of the projection projecting radially inwards. Hence, the projection 25 is more rigid than the sealing portion 21 and the notch 23, wherein the sealing portion 21 and the notch 23 is folded instead of the projection 25 when the ejector 15 is displaced axially. The connecting portion 20 is pushed up towards the cap 19 while the sealing portion 21 is folded inwards and downwards, so that the sealing portion 21 is brought into contact with the sealing part 24, as illustrated in FIG. 6. Hence, the sealing portion 21 is folded to a position in which it extends substantially axially downwards or obliquely downwards and inwards for interaction with the sealing part 24 while the notch 23 connects the sealing portion 21 and the sealing part 24. The sealing portion 21 is folded towards the connecting portion 20 of the neck 18, so that the sealing portion 21 and the sealing part 24 are arranged between the connecting portion 20 and the centre axis X, i.e. within the connecting portion 20 of the neck 18. For example, the sealing portion 21 is folded to a position in which the locking means 26 interacts with the locking element 27. Then, the ejector 15 is brought further forwards in the axial direction while bringing along the package closure in the same direction, as illustrated by means of the arrow G in FIG. 7, so that the projection 25 is disengaged from the inner tool core 17 through its inherent flexibility and can leave the device for producing the package closure 10. For example, the projection 25 returns to its original position by its flexibility, as illustrated in FIG. 8.

The ejection of the package closure is, for example, performed within one or a few seconds after moulding thereof, wherein the temperature of the material in the package closure 10 is above room temperature and, for example, above 40° C. or about 60° C., so that the material is semi liquid during the ejection.

For example, the cap 19 comprises a peripheral portion 30 extending radially outside the sealing part 24 for abutment against a radially extending connection portion 31, through which connection portion 31 the sealing portion 21 is connected to the connecting portion 20, when the package closure 10 has been produced and the cap 19 is closed.

Figure 9:
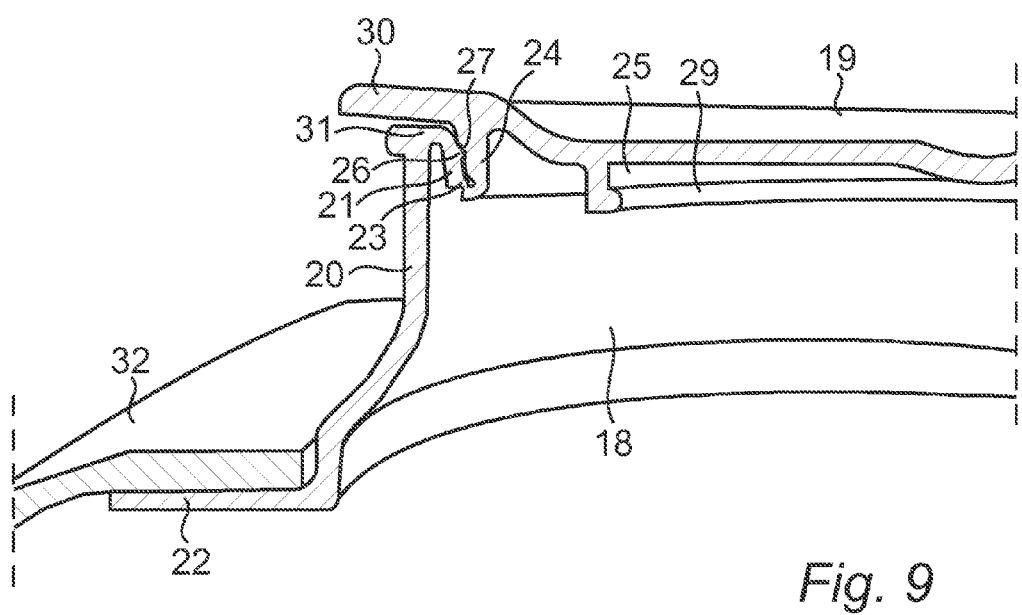
Figure 10:
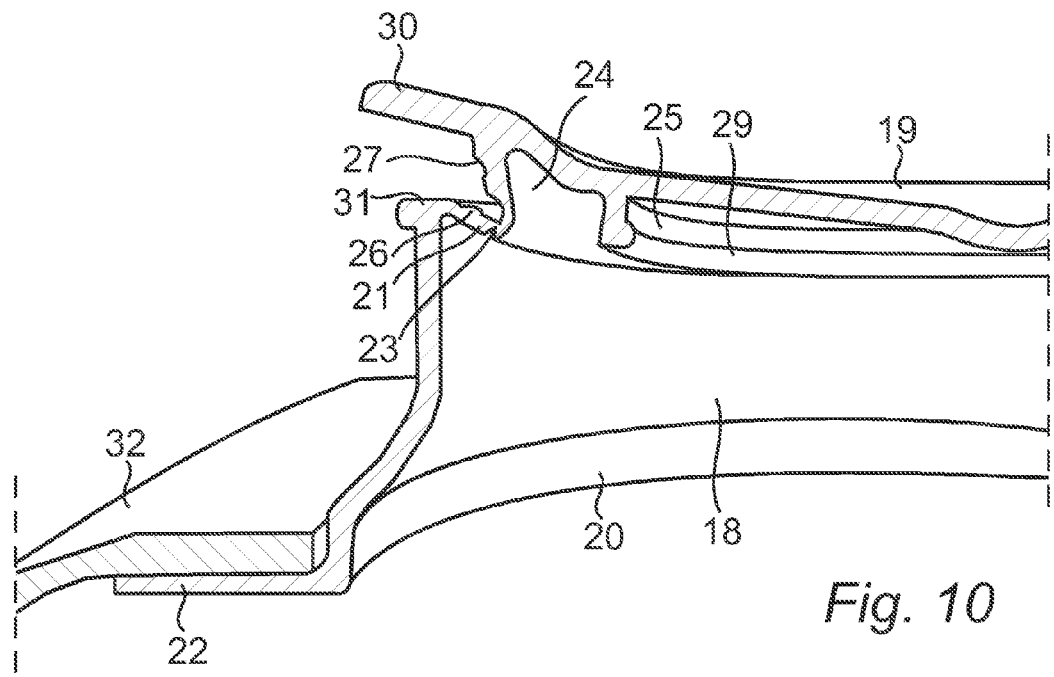
Figure 11:
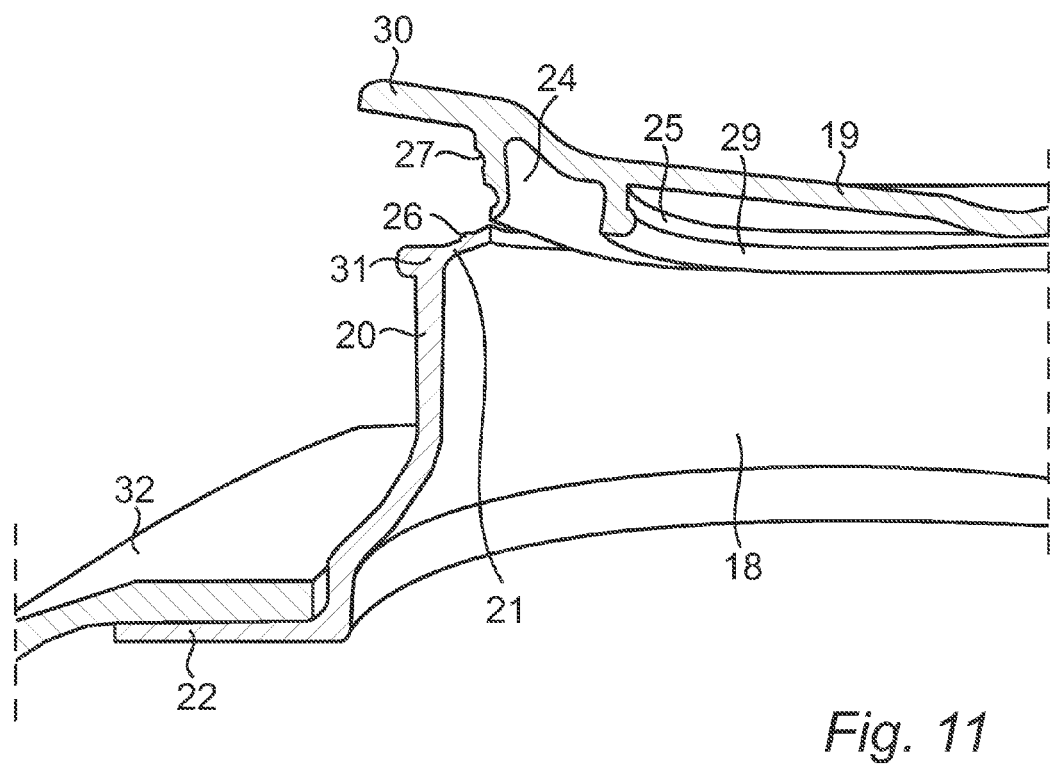

With reference to FIG. 9 the package closure 10 is illustrated according to one embodiment of the invention in which the package closure 10 is connected to a package 32 and is unopened, wherein the notch 23 is intact. During opening of the cap 19 the sealing portion 21 will be folded somewhat upwards in a direction away from the sealing portion 20, as illustrated in FIG. 9 and FIG. 10, after which the notch 23 is broken, as illustrated in FIG. 11, until the cap 19 can be opened, as illustrated in FIG. 12. For example, the cap 19 is connected to the neck 18 through a hinge portion to form a hinge function, so that the cap 19 can be opened and closed. Alternatively, the cap 19 can be entirely disengaged from the neck 18.

In FIG. 12 the cap 19 is illustrated in the open position in which the cap 19 has been opened or removed from the neck 18. When the cap 19 is in its open position the sealing portion 21 extends obliquely downwards and inwards, so that the sealing portion 21 is arranged within the connecting portion 20 of the neck 18 and a free end of the sealing portion 21 points away from the cap 19 towards an opening of the package to interact with the package closure 10. When the cap 19 is in its open position the sealing portion 21 is disengaged from the cap 19 and the sealing part 24 and is not affected by the cap 19 or the sealing part 24. The sealing portion 21 is folded negatively and is inclined inwards towards the centre axis X, so that the free end of the sealing portion 21 is arranged at a distance S from the interior side of the connecting portion 20 of the neck 18 when the sealing portion 21 not is affected by the sealing part 24. More specifically, an inner side of the free end of the sealing portion 21, directed towards the centre axis X, is arranged at the distance S from the interior side of the connecting portion 20 of the neck 18. For example, an angle between the sealing portion 21 and the connecting portion 20 of the neck 18 is less than 90°, for example 5°-45°, 10°-30° and for example, about 15°.

In FIG. 13 the cap 19 is illustrated in closed position. During closing of the cap 19 the sealing part 24 and the sealing portion 21 interact to form a snap-lock function, wherein the cap 19 is resealable. For example, the sealing portion 21 is arranged with a flexibility allowing for a radial displacement in relation to the sealing part 24 during closing of the cap 19, so that the sealing portion 21 is pushed somewhat to the side radially outwards by interaction with the sealing part 24, so that the sealing portion 21 is pushed against the sealing part 24 to form a sealing when the cap 19 is closed. Hence, the sealing portion 21 is pushed radially outwards in a direction away from the centre axis X and in a direction towards the connecting portion 20 of the neck 18 when interacting with the sealing part 24, so that the free end of the sealing portion 21 is positioned at a distance from the connecting portion 20 of the neck 18 which is smaller than the distance S. Hence, the sealing portion 21 pushes against the sealing part 24 by means of the inherent flexibility of the material to form a bias or sealing force towards the sealing part 24. An outer side of the sealing part 24 is arranged at a distance T from the inner side of the connecting portion 20 of the neck 18 when the cap 19 is closed. The distance T is smaller than the distance S. Hence, the length of the sealing portion 21 is larger than the distance T, wherein the length and angle of the sealing portion 21 are coordinated with the distance T between the inner side of the connecting portion 20 of the neck 18 and the sealing part 24, so that an inner side of the sealing portion 21 abuts against an outer side of the sealing part 24 in such a way that the sealing portion 21 is in a clamped position and pushes against the sealing part 24 with a sealing force when the cap 19 is in its closed position. For example, the sealing portion 21 is pushed to the side during closing of the cap 19, so that the locking means 26 and the locking element 27 can engage each other to form a tight snap-lock function. For example, the sealing part 24 pushes the sealing portion 21 to the side when resealed, so that the locking means 26 can be received in the locking element 27. Alternatively, the sealing part 24 is flexible in relation to the sealing portion 21 or both of the sealing portion 21 and the sealing part 24 are flexible.

With reference to FIG. 14 and FIG. 15 the package closure 10 is illustrated according to one embodiment of the invention, in which the cap 19 is connected to the neck 18 through a hinge portion 33. In the embodiment of FIGS. 14 and 15 the cap 19 is provided with a first snap-lock part 34, wherein the neck 18 is provided with a second snap-lock part 35 forming a snap-lock function between the cap 19 and the neck 18, so that the cap 19 is detachably connectable to the neck 18 in its open position. Hence, the cap 19 is connectable to the neck 18 through the first and second snap-lock parts 34, 35, so that the cap can be kept in its open position during emptying of the package. For example, a rear portion of the cap 19 is connected to the neck 18 through the hinge portion 33, wherein the first snap-lock part 34 is arranged in the rear portion of the cap 19. For example, the first snap-lock part 34 is arranged as a ridge extending along the rear portion of the cap 19 and substantially in parallel to the hinge portion 33. The second snap-lock part 35 is, for example, arranged as a recess 36 extending radially outwards from the connecting portion 20 of the neck 18 to receive the first snap-lock part 34. The snap-lock function is provided through the inherent flexibility of the first snap-lock part 34 and/or the second snap-lock part 35 in a conventional manner.

With reference to FIG. 16 and FIG. 17 the package closure 10 is illustrated according to one embodiment of the invention in which the package closure 10 is provided with a first fastening part 37 and a second fastening part 38 for interaction with the first fastening part 37 to form an exterior fastener for fastening the cap 19 in its closed position and to prevent unintentional opening of the cap 19. The first fastening part 37 is adjustable from its locked position to an unlocked position. The first fastening part 37 is arranged on the cap 19 and comprises a part 39 projecting radially from the cap 19, and a part 40 projecting axially therefrom to form a downwards projecting clutch or similar. The axially projecting part 40 is, in the illustrated embodiment, provided with a wider free end 41 pointing downwards to form a receiving cavity for receiving the second fastening part 38. For example, the axially projecting part 40 is provided with grooves 42 or similar towards the sealing part 24 of the cap 19 to provide increased friction against the second fastening part 38. The second fastening part 38 comprises a radially outwards extending convexity 43 for interaction with the axially projecting part 40 of the first fastening part 37 to form a snap-lock function. The axially projecting part 40 is resiliently flexible due to the properties of the material, so that the axially projecting part 40 at least partially can be forced to pass the convexity 43 and be clamped behind the convexity 43 or the outermost portion of the convexity 43 by the resilient flexibility of the material. For example, the grooves 42 are arranged for abutment against the convexity 43 to prevent the convexity from leaving the receiving cavity and the axially projecting part 40 from disengaging the convexity 43.

With reference to FIG. 18 a tool core 14 and a package closure 10 is illustrated according to one embodiment. One difference to the embodiment of FIGS. 1-3 is that the tool core 14 does not comprise the inner and outer tool cores 16, 17 but is formed as one unit. Hence, a faster production process is obtained as well as a less expensive device for producing the package closure 10 and material savings as the projection 25 can be omitted. Additionally, considerable energy savings and a more environmentally friendly production are obtained.

During production of the package closure 10 the tool core 14 extends along an interior side of the cap 19, the sealing part 24, the notch 23, the sealing portion 21 and along at least a substantial part of an inner side of the connecting portion 20. The tool core 14 interacts with the ejector 15, wherein the ejector 15 is arranged radially outside the tool core 14 and wherein the ejector 15 and the tool core 14 are movable in relation to each other in the axial direction. For example, the ejector is displaceable in the axial direction in relation to the tool core 14.

In the embodiment of FIG. 18 the sealing part 24 is provided with the flange 29 for interaction with the tool core 14, wherein the flange 29 extends radially inwards from the sealing part 24 for interaction with the recess 28 of the tool core 14, so that the tool core 14 can hold back the cap 19 when the connecting portion 20 is brought towards the cap 19 while the sealing portion 21 is folded inwards by means of the ejector 15.

As illustrated in FIG. 18, the sealing portion 21 is arranged with a length u which, for example, has a length equal to or larger than a length v of the sealing part 24. For example, the length u of the sealing portion 21 is 0.1-2 mm, 0.2-1 or about 0.5 mm longer than the length v of the sealing part 24. Hence, a bias is provided assisting in keeping the cap 19 in the closed position.

Figure 19:
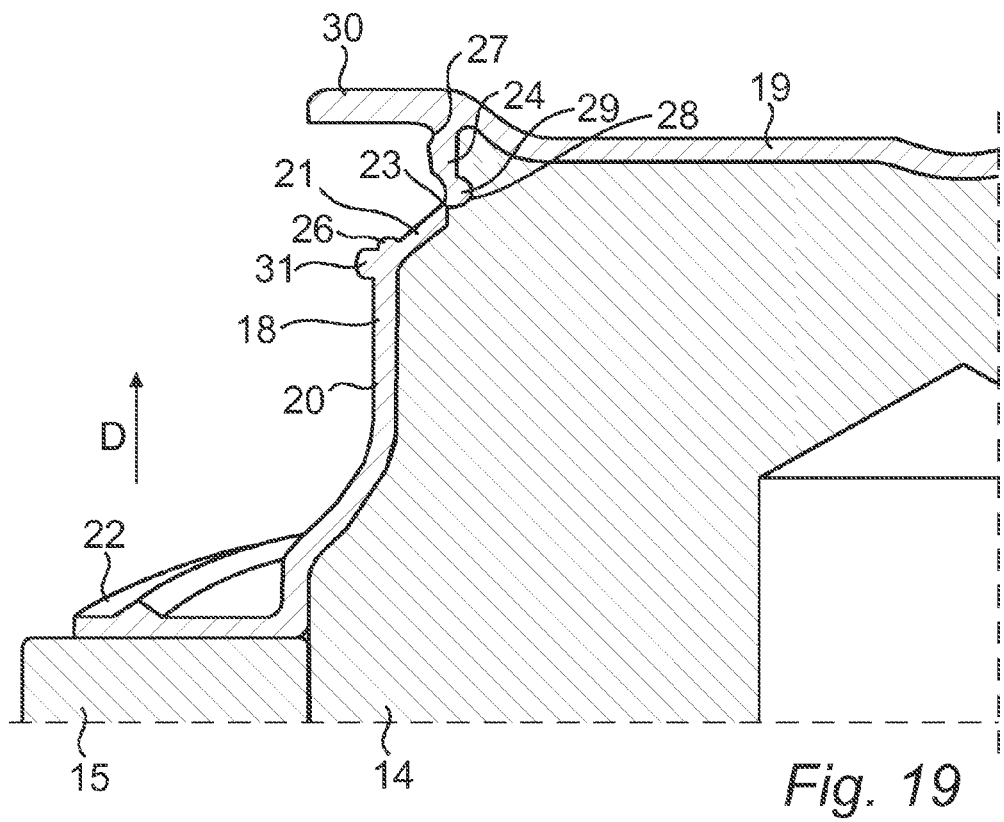

In FIGS. 19-23 is an ejection process illustrated schematically in which a moulded package closure 10 is ejected from the device for producing it. In FIG. 19 the ejector 15 and the tool core 14 are illustrated in a position for moulding the package closure 10. For example, the package closure 10 is moulded in one piece in a corresponding way as described above, wherein the cap 19 and the neck 18 is one integrated piece. The jaws 11, 12 and the tool core 14 form a continuous mould for moulding the neck 18 and the cap 19 as one continuous piece. For example, the sealing portion 21 is connected to the sealing part 24 through the notch 23, so that a free end of the sealing portion 21 and a free end of the sealing part 24 are formed when the notch 23 is broken.

Figure 20:
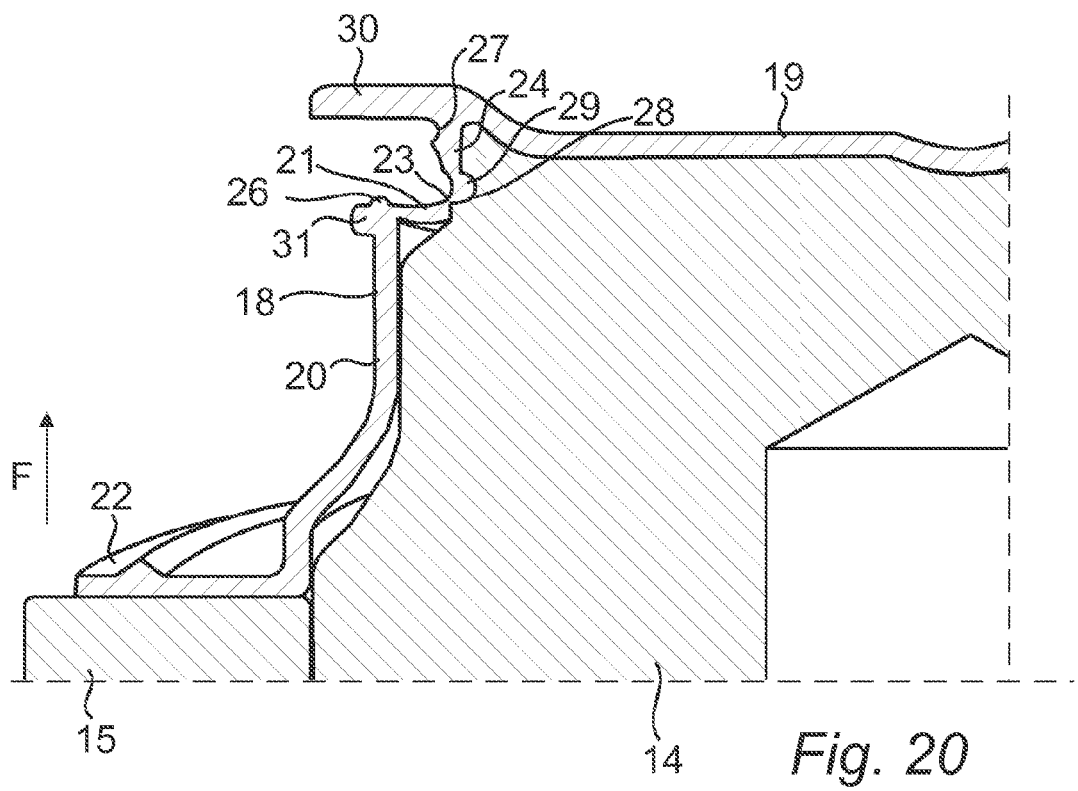
Figure 21:
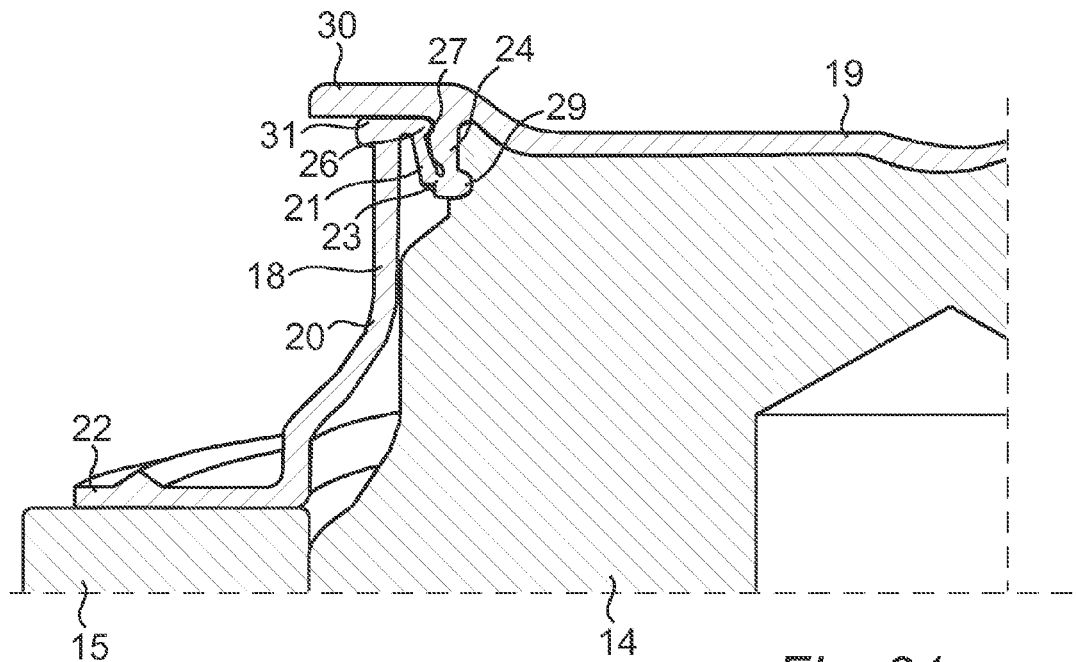
Figure 22:
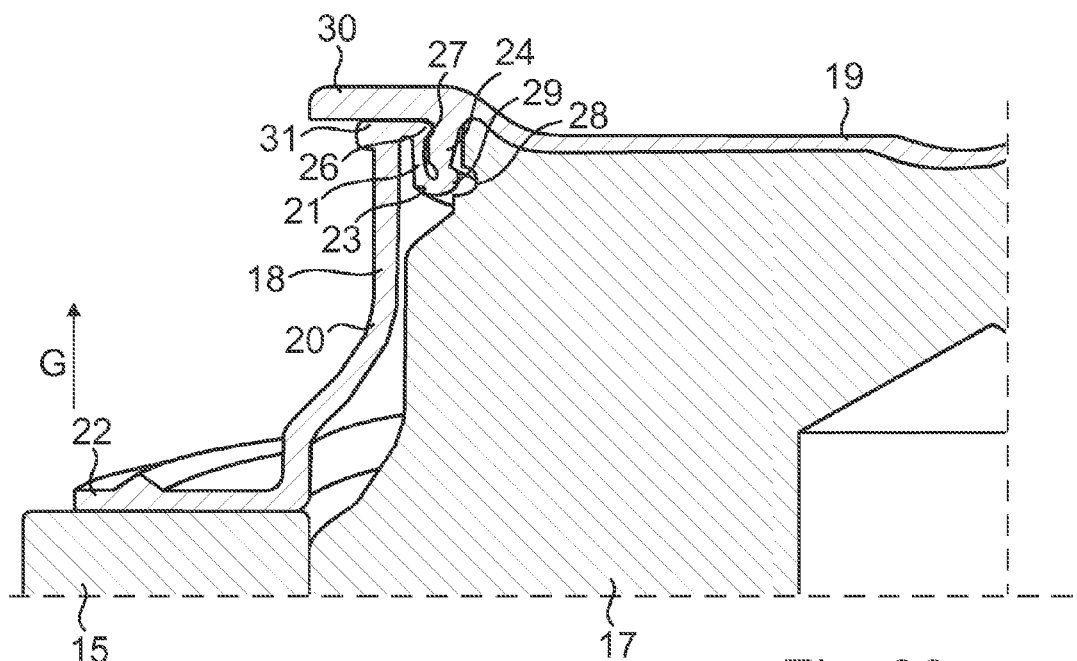

After moulding the package closure 10, when the material in the package closure 10 still is soft and has not entirely solidified or crystallized, the ejector 15 is brought axially forward in relation to the tool core 14, as illustrated by means of the arrows D and F in FIGS. 19-20, while the tool core 14 simultaneously interacts with the flange 29 to hold back the cap 19, so that the neck is displaced in relation to the cap 19 by means of the ejector 15 during bending of the sealing portion 21 and folding along the notch 23. The ejector 15 is displaced in relation to the cap 19 while the sealing portion 21 simultaneously is folded inwards, so that the sealing portion 21 is bent towards the connecting portion 20. Hence, the sealing portion 21 is bent in relation to the connecting portion 20 of the neck 18 while the sealing portion 21 simultaneously is folded in relation to the sealing part 24 of the cap 19 and along the notch 23, so that the sealing portion 21 and the sealing part 24 are folded within the connecting portion 20 and the sealing portion 21 at least partially extends in parallel to the sealing part 24 between the connecting portion 20 and the sealing part 24 as illustrated in FIG. 21. For temporarily holding back the cap 19 the recess 28 of the tool core 14 holds the flange 29. Hence, the sealing portion 21 is folded to a position between the connecting portion 20 and the centre axis X in which the sealing portion 21 extends radially inwards and axially downwards for interaction with the sealing part 24 while the notch 23 connects the sealing portion 21 and the sealing part 24. For example, the sealing portion 21 is folded to a position in which the locking means 26 interacts with the locking element 27. Then, the ejector 15 is brought further axially forward while bringing along the package closure 10 in the same direction, as illustrated by means of the arrow G in FIG. 22, so that the flange 29, by an inherent flexibility of the flange 29, the sealing part 24 and the sealing portion 21, are disengaged from the tool core 14 and can leave the device for producing the package closure 10. For example, the sealing part 24 and the sealing portion 21 return to their original positions by their flexibility, as illustrated in FIG. 23.

With reference to FIG. 24 the package closure 10 according to FIG. 23 is illustrated wherein the package closure 10 is connected to a package 32 and is unopened and the notch 23 not has been broken. Opening and resealing of the package closure 10 work in a corresponding manner as described above with reference to FIGS. 10-13.

With reference to FIG. 25 and FIG. 26 a package closure 10 is illustrated according to one embodiment of the invention in which the cap 19 and the neck 18 have a triangular shape with rounded corners. Hence, the package closure 10 is formed with a thinner part and a wider part, wherein the thinner part is arranged to facilitate emptying of a package connected to the package closure 10. For example, the wider part of the cap 19 is connected to the wider part of the neck 18 through a hinge portion 33.

The invention claimed is:

1. A package closure comprising a center axis, a neck provided with an opening, and a cap for closing the opening, wherein the neck comprises a connecting portion for connection to a package, and a sealing portion partially projecting radially inwards from the connecting portion to interact with a sealing part of the cap to form a seal between them, wherein:

the sealing part of the cap, before opening thereof, is connected to the sealing portion through a frangible notch, wherein the cap is removable from at least a part of the sealing portion by tearing along the frangible notch, the sealing part is projecting from an interior side of the cap to interact with the sealing portion of the neck, so that the package closure is resealable, the sealing portion and the sealing part are folded within the connecting portion along the frangible notch, wherein the sealing portion extends axially downward and inward, the sealing portion, at least after opening of the package closure, extends axially downward and terminates at a free end, and the sealing portion, at least after resealing of the package closure, extends at least partially in axial direction between the connecting portion and the sealing part and form the seal by resilient interaction with the sealing part.

2. A package closure according to claim 1, wherein the sealing part is arranged at a distance in the radial direction from an inner side of the connecting portion of the neck, wherein an inner side of the free end of the sealing portion is arranged at a distance in the radial direction from an inner side of the connecting portion of the neck after opening of the package closure, and wherein the distance between the inner side of the free end of the sealing portion and the connecting portion of the neck is larger than the distance between the sealing part and the connecting portion of the neck when the sealing portion is unaffected by the sealing part.

3. A package closure according to claim 1, wherein an interior side of the cap is provided with a radially inwards projecting flange for interaction with a tool core in a device for producing the package closure, so that the cap is connected to the tool core during production thereof.

4. A package closure according to claim 3, wherein the sealing part is provided with the flange.

5. A package closure according to claim 3, wherein an interior side of the cap is provided with a flexible projection with the flange, the flexible projection being arranged radially within the sealing part and extending axially.

6. A package closure according to claim 3, wherein the sealing portion is flexible in relation to the connecting portion, so that the connecting portion is displaceable in axial direction in relation to the cap during bending of the sealing portion and folding along the frangible notch when the cap is connected to the tool core by the flange.

7. A package closure according to claim 1, wherein a length of the sealing portion is longer than a length of the sealing part.

8. A package closure according to claim 1, wherein the sealing portion and the sealing part interact through a snap-lock function.

9. A package closure according to claim 1, wherein the cap is connected to the neck through a hinge portion, so that the cap can be pivoted around the hinge portion, and wherein a portion of the cap and the neck interact through a snap-lock function, so that the cap can be connected to the neck in its open position.

10. A package closure according to claim 1, wherein the frangible notch, before opening of the package closure, is arranged in contact with the sealing part and the sealing portion.

11. A device for producing a package closure according to claim 1, the device comprising a movable first jaw, a movable second jaw and a tool core for interaction with the jaws to form a mould for the package closure, and an ejector for ejecting the produced package closure, wherein:
   the tool core and the jaws are arranged to form a connecting portion and a sealing portion of the neck and a frangible notch between the sealing portion and the sealing part of the cap, wherein the cap is removable from at least a part of the sealing portion by tearing the frangible notch, after which the sealing portion extends axially downward and inward and terminates at a free end, and
   the tool core comprises a radially extending recess for forming an interaction with a flange of the cap, so that the connecting portion of the neck is displaceable in relation to the cap by means of the ejector during bending of the sealing portion and folding along the frangible notch until the sealing portion and the sealing part are folded within the connecting portion when the cap is connected to the tool core through the flange, wherein the package closure is resealable by interaction between the sealing portion and the sealing part after tearing the frangible notch.

12. A device according to claim 11, wherein the jaws and the tool core are arranged to form the neck and the cap as one integral unit.

13. A device according to claim 11, wherein the tool core is arranged within the ejector in the radial direction.

14. Method for producing a package closure according to claim 1, the method comprising:
   by means of movable jaws and a tool core forming a connecting portion and a sealing portion of the neck and a frangible notch between the sealing portion and a sealing part of the cap, wherein the cap is removable from at least a part of the sealing portion by tearing along the frangible notch after which the sealing portion extends axially downward and inward and terminates at a free end,
   by means of a radially extending recess of the tool core forming a flange on the interior side of the cap, the flange being for interaction with the tool core,
   removing the jaws from the moulded package closure,
   by means of the tool core holding back the cap by the flange arranged on the interior side of the cap and simultaneously, by means of an ejector, displacing the connecting portion of the neck in relation to the cap during bending of the sealing portion and folding along the frangible notch until the sealing portion and the sealing part are folded within the connecting portion, wherein the package closure is resealable by interaction between the sealing portion and the sealing part after tearing the frangible notch, and
   by means of the ejector displacing the package closure in relation to the tool core, so that the flange is disengaged from the tool core.

15. Method according to claim 14, comprising the step of producing the neck and the cap as one integral unit.

16. Method according to claim 14, comprising the step of displacing the connecting portion of the neck in relation to the cap, bending the sealing portion and folding along the frangible notch so that the sealing portion is folded inwards and is arranged between the connecting portion of the neck and a centre axis of the package closure.

* * * * *